Oct. 19, 1954

T. C. KELLY 2,692,073

OLIVE PACKING MACHINE

Filed May 2, 1950

INVENTOR.
Thomas C. Kelly
BY
Mann and Brown
Attys.

Oct. 19, 1954
T. C. KELLY
2,692,073
OLIVE PACKING MACHINE
Filed May 2, 1950
12 Sheets-Sheet 2
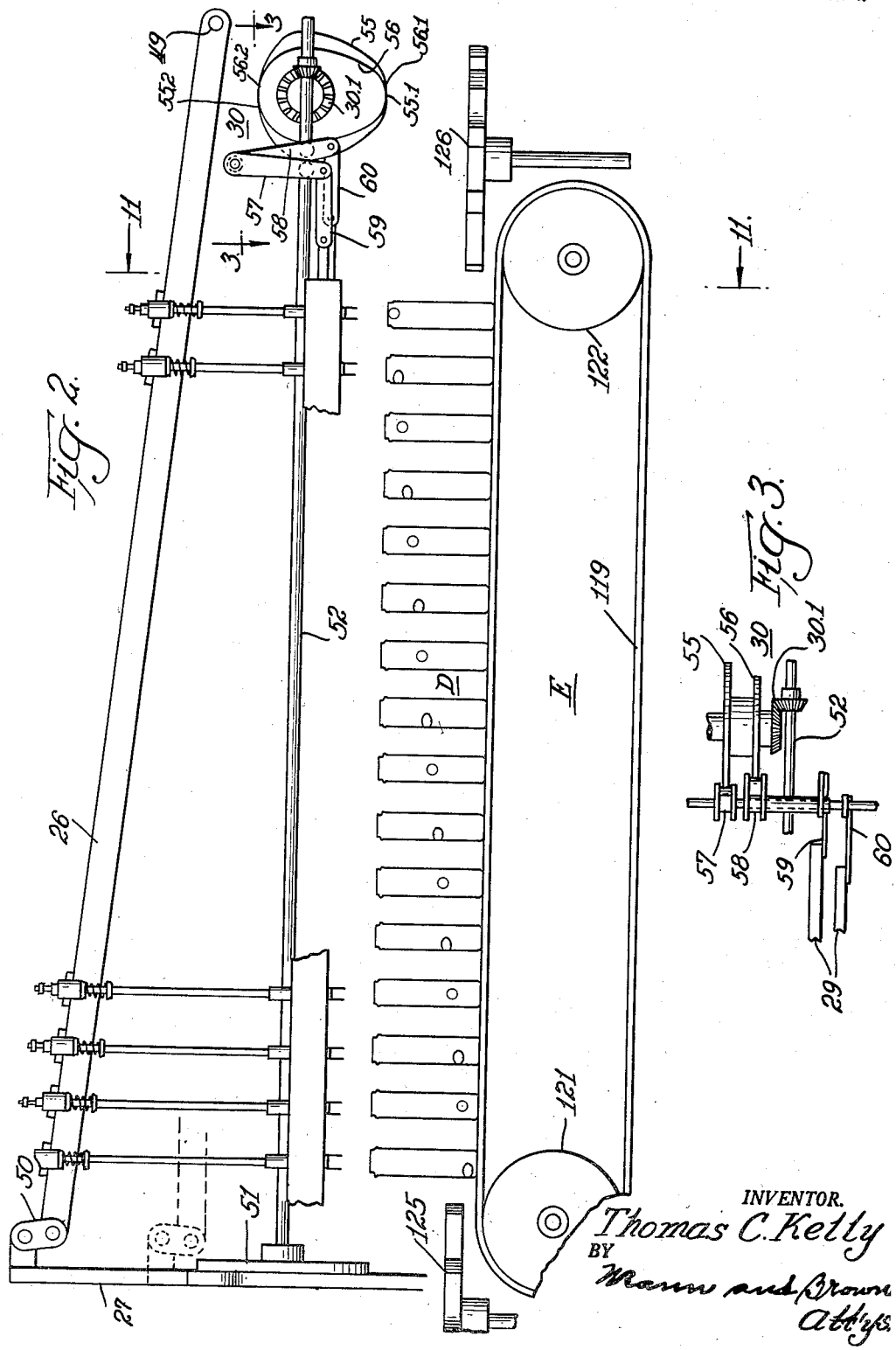
INVENTOR.
Thomas C. Kelly
BY
Mann and Brown
Attys.

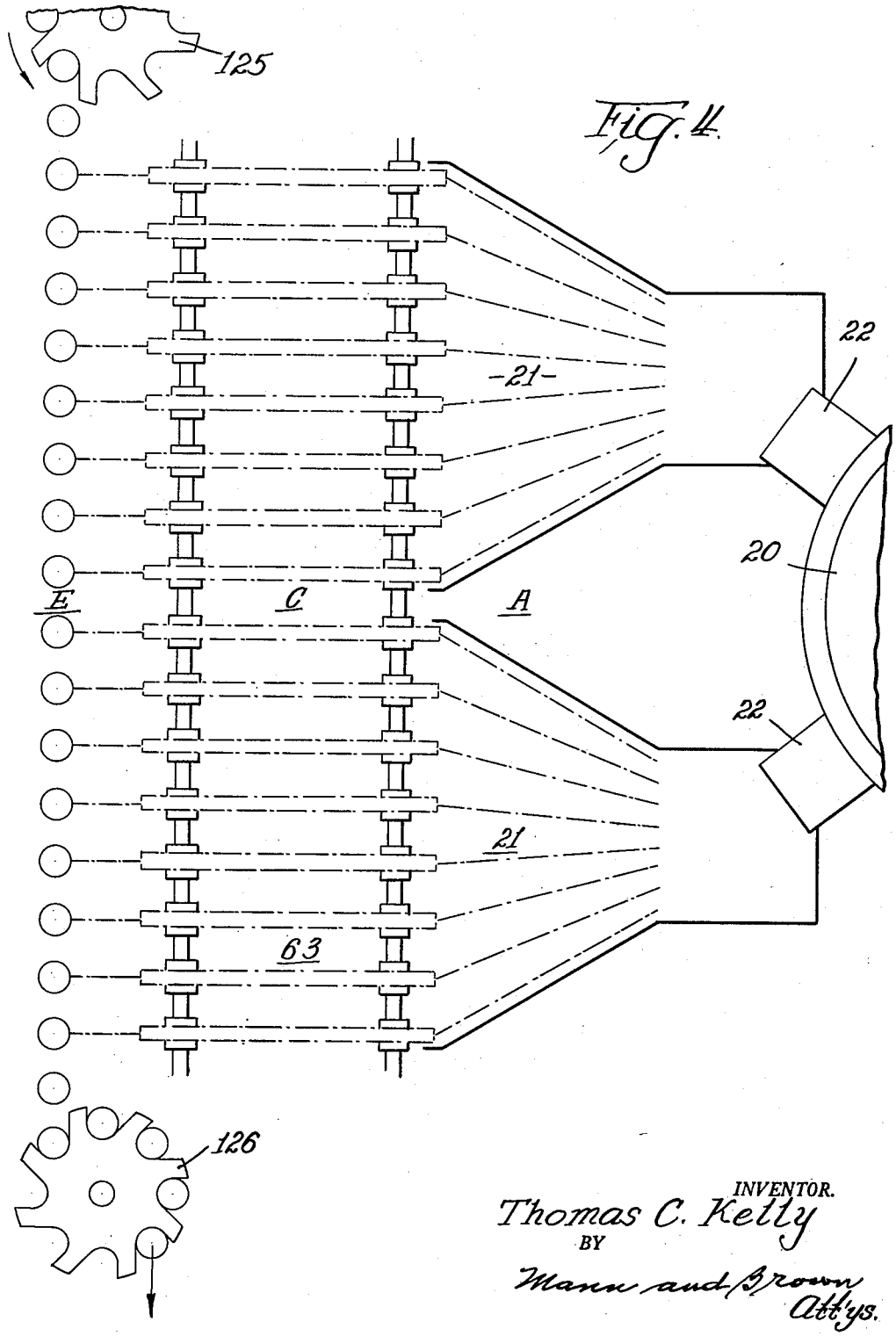

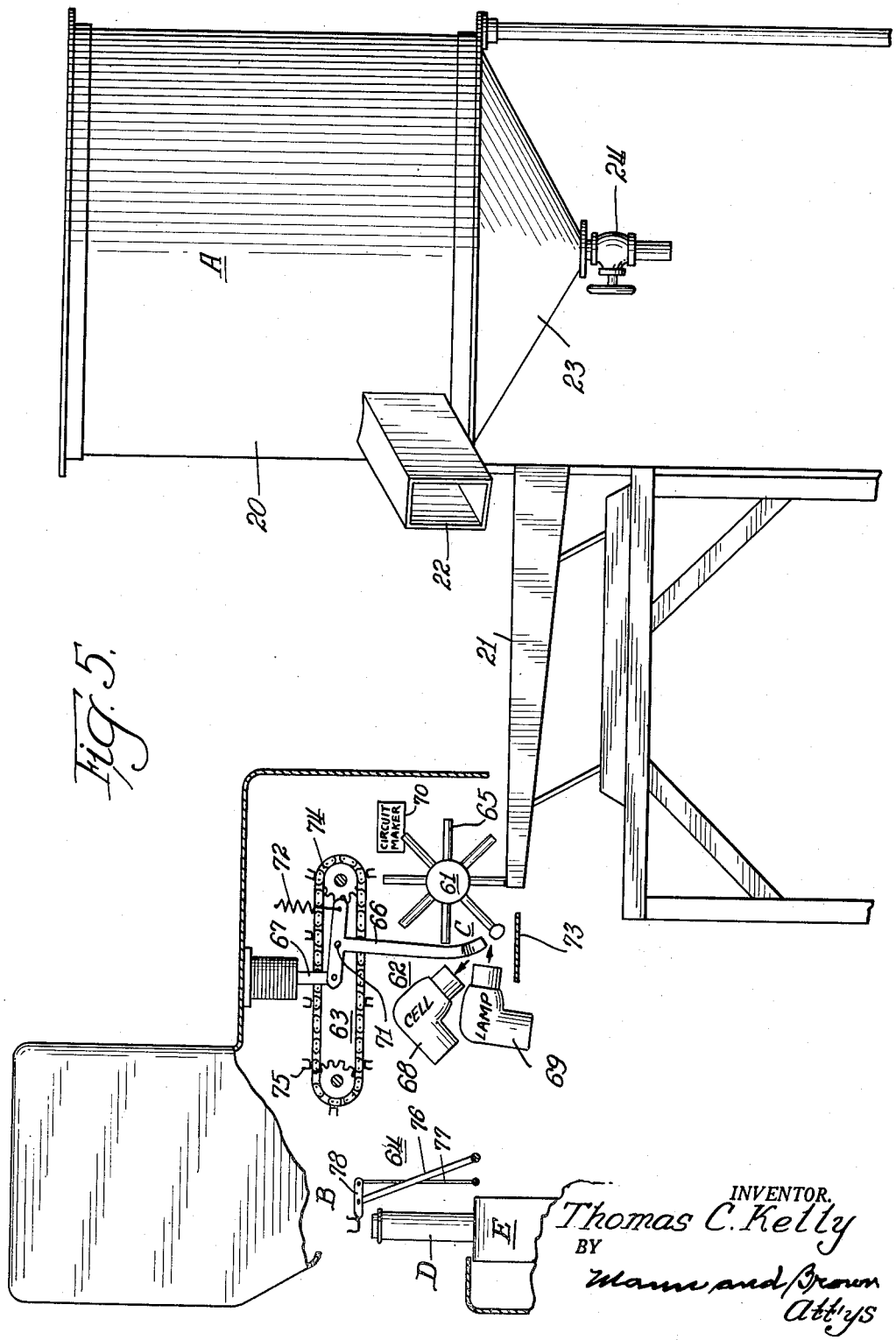

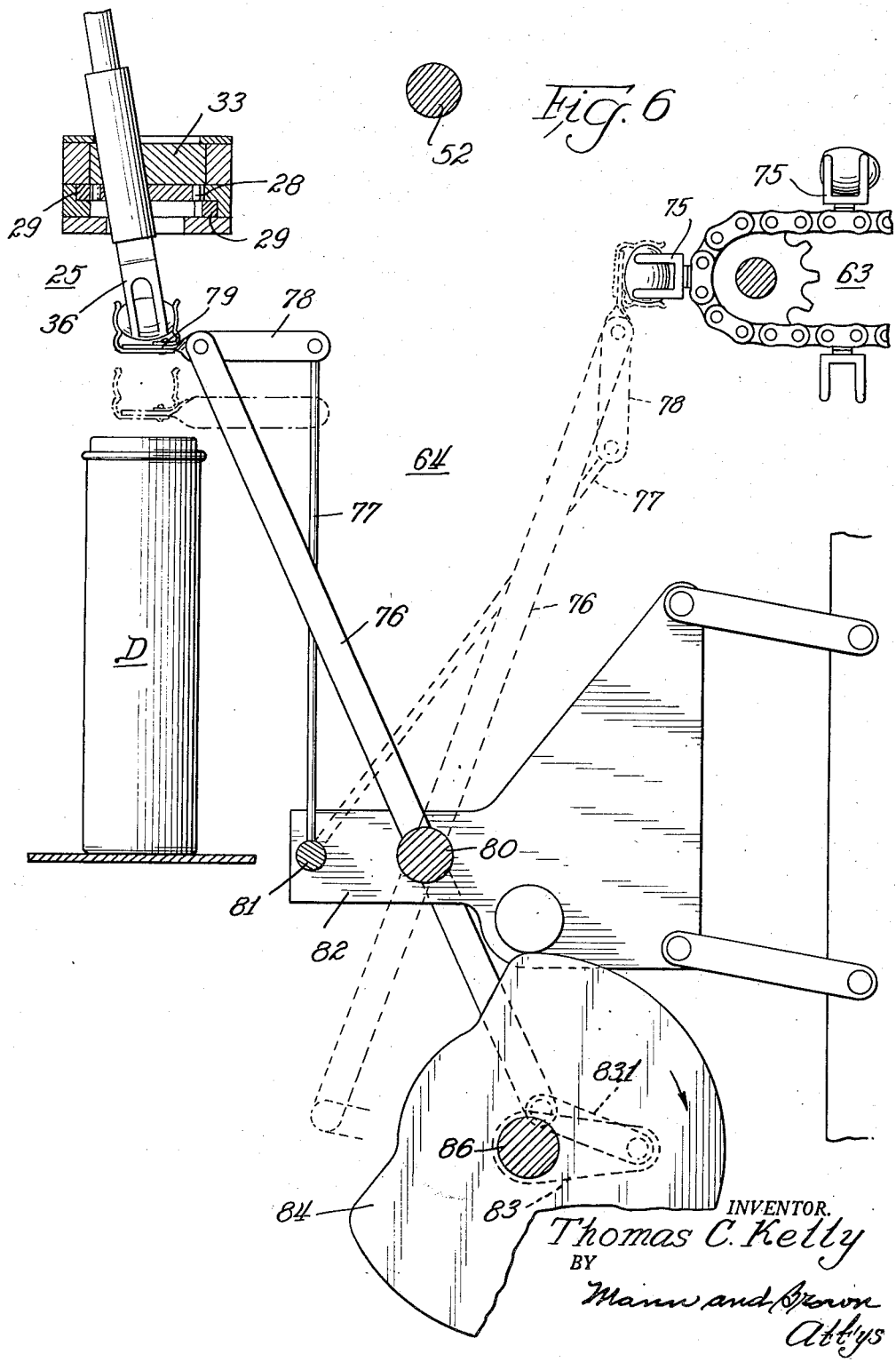

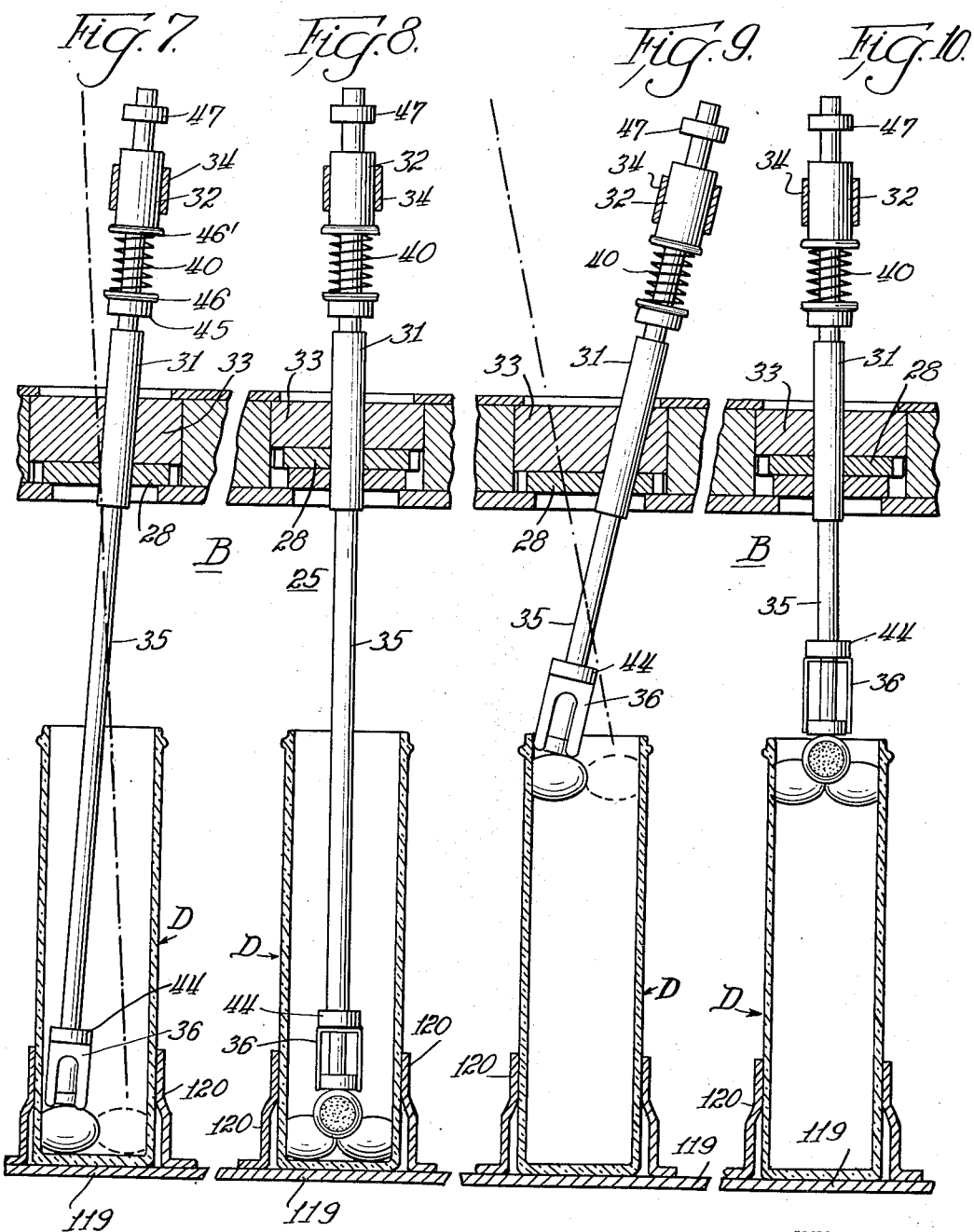

Oct. 19, 1954
T. C. KELLY
2,692,073
OLIVE PACKING MACHINE
Filed May 2, 1950
12 Sheets-Sheet 7
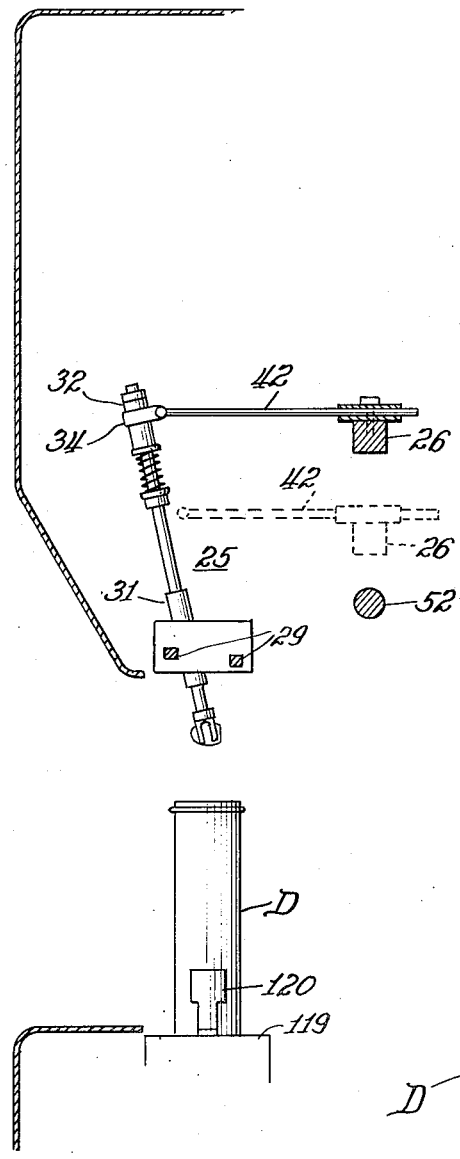
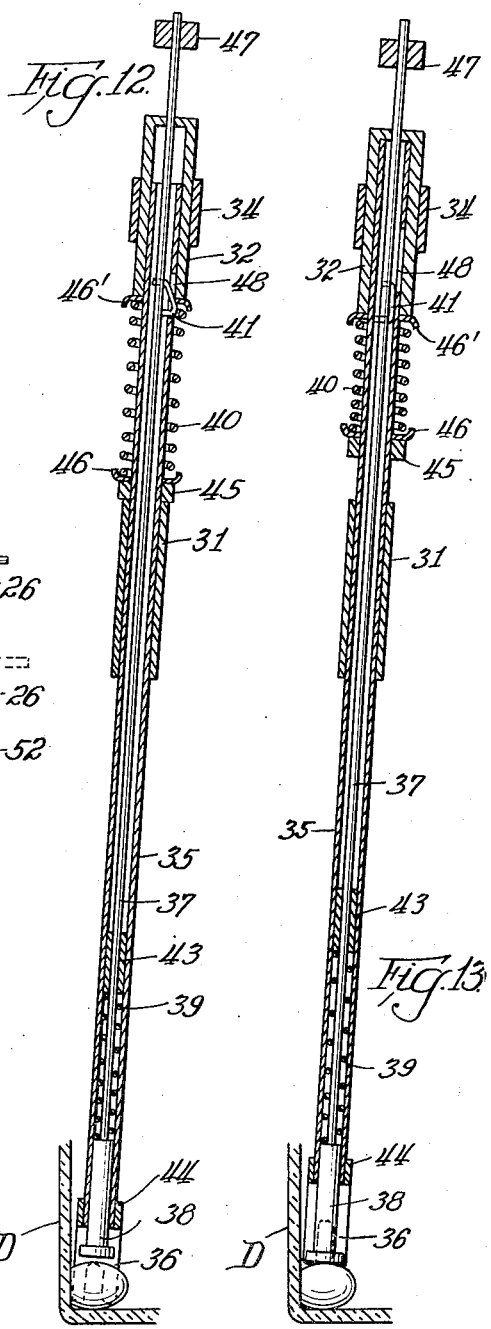
INVENTOR.
Thomas C. Kelly
BY
Mann and Brown
Att'ys Oct. 19, 1954
T. C. KELLY
2,692,073
OLIVE PACKING MACHINE
Filed May 2, 1950
12 Sheets-Sheet 8
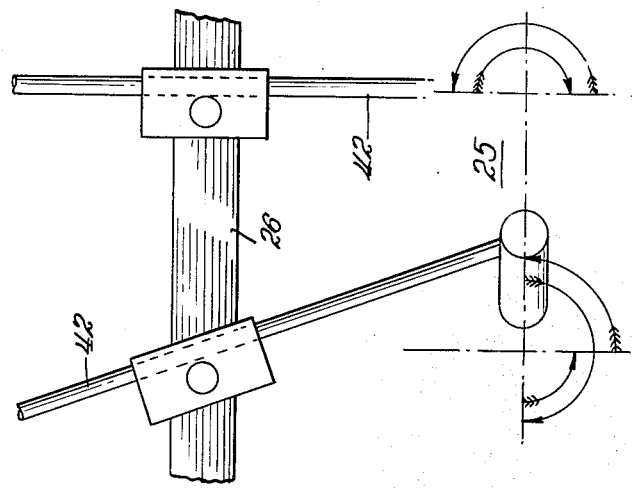
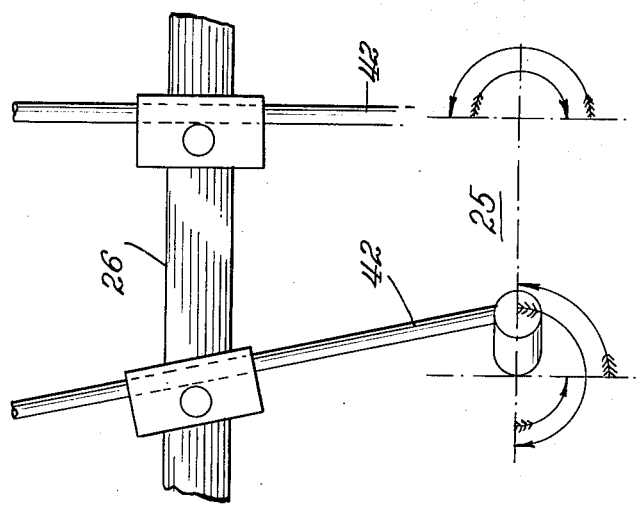
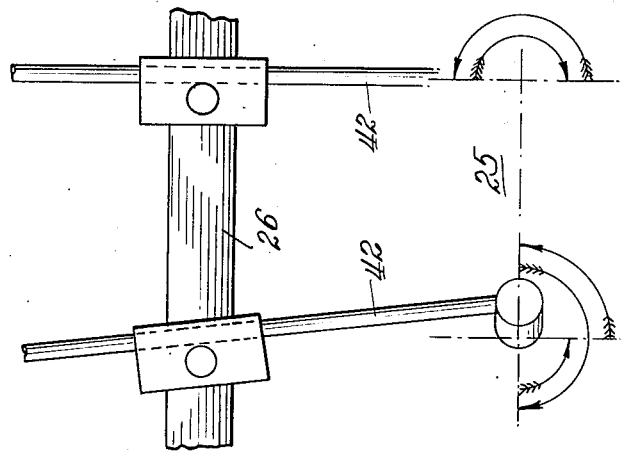
INVENTOR.
Thomas C. Kelly
BY
Mann and Brown
Attys.

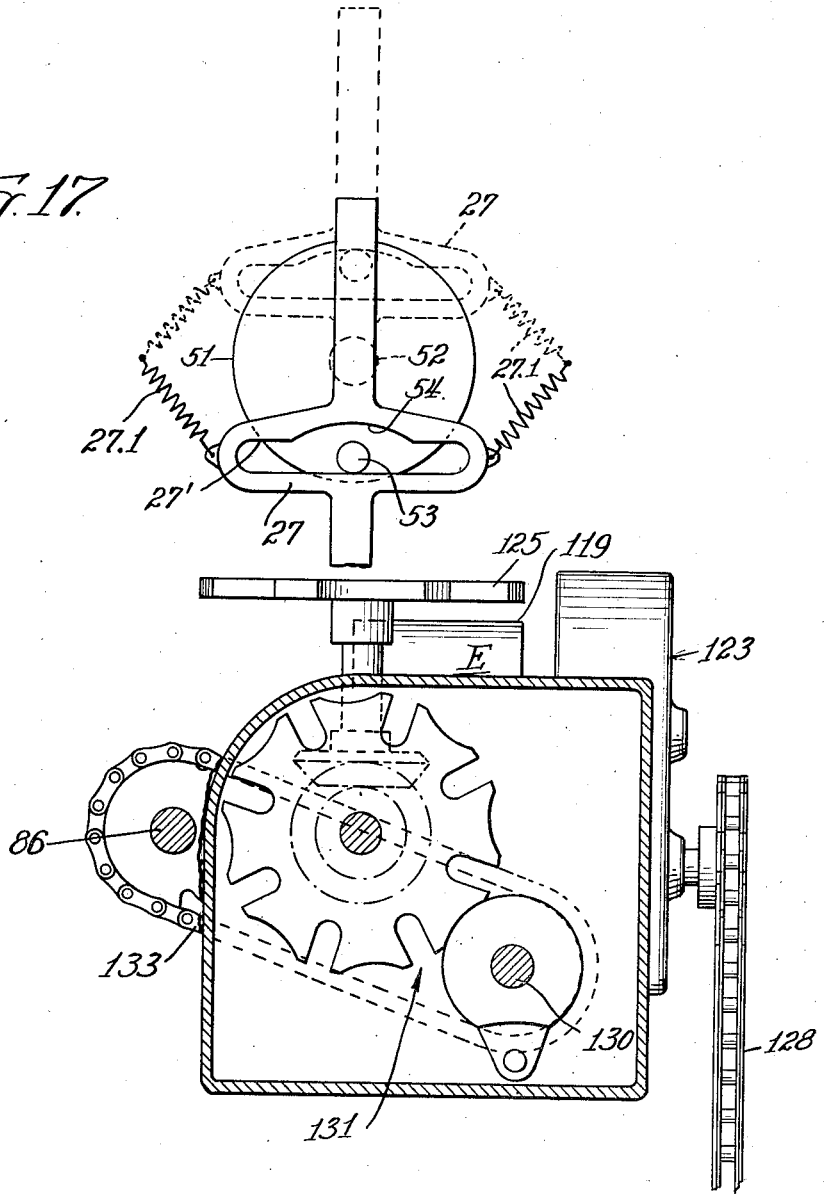

Oct. 19, 1954
T. C. KELLY
2,692,073
OLIVE PACKING MACHINE
Filed May 2, 1950
12 Sheets-Sheet 10
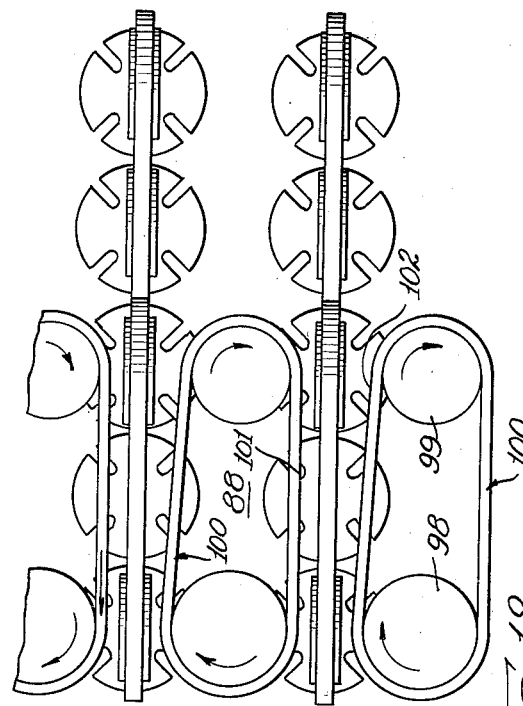
Fig. 18.
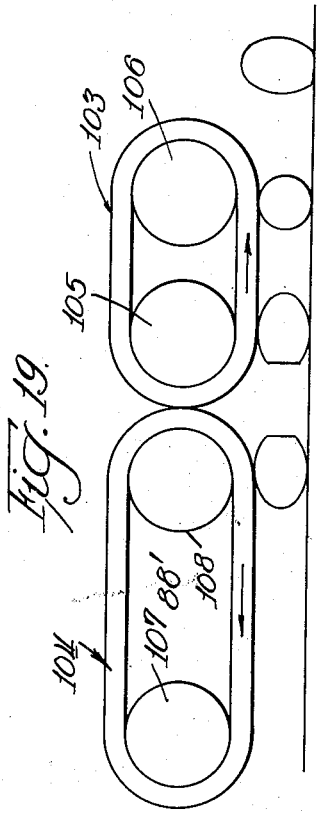
Fig. 19.
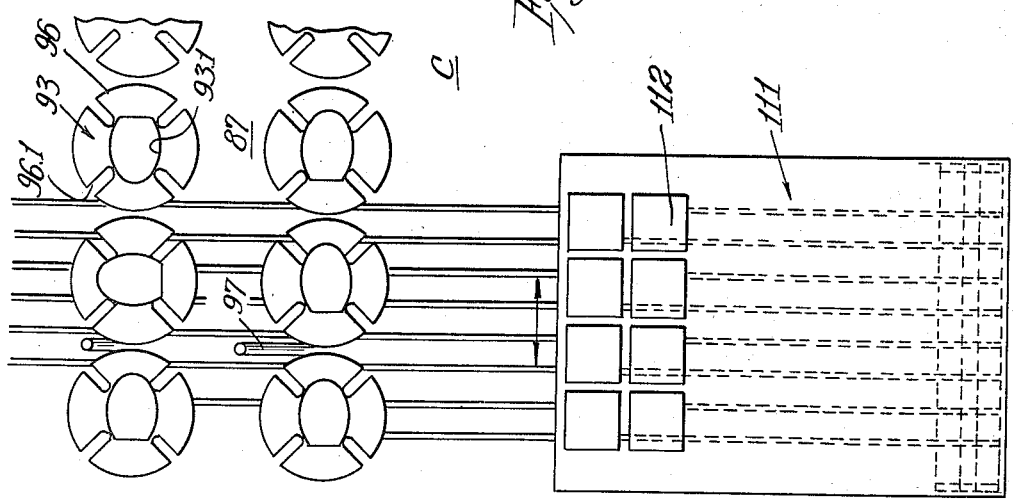
INVENTOR.
Thomas C. Kelly
BY
Mann and Brown
Attys.

Oct. 19, 1954
T. C. KELLY
2,692,073
OLIVE PACKING MACHINE
Filed May 2, 1950
12 Sheets-Sheet 11
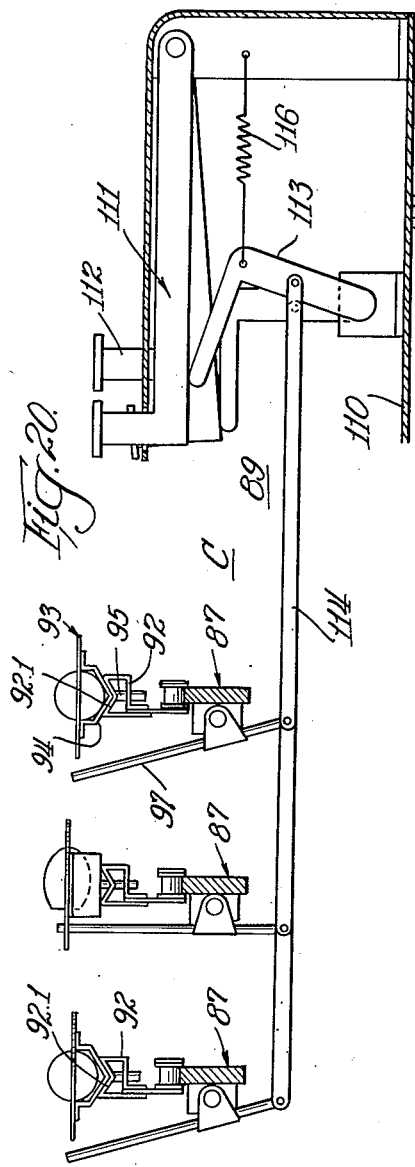
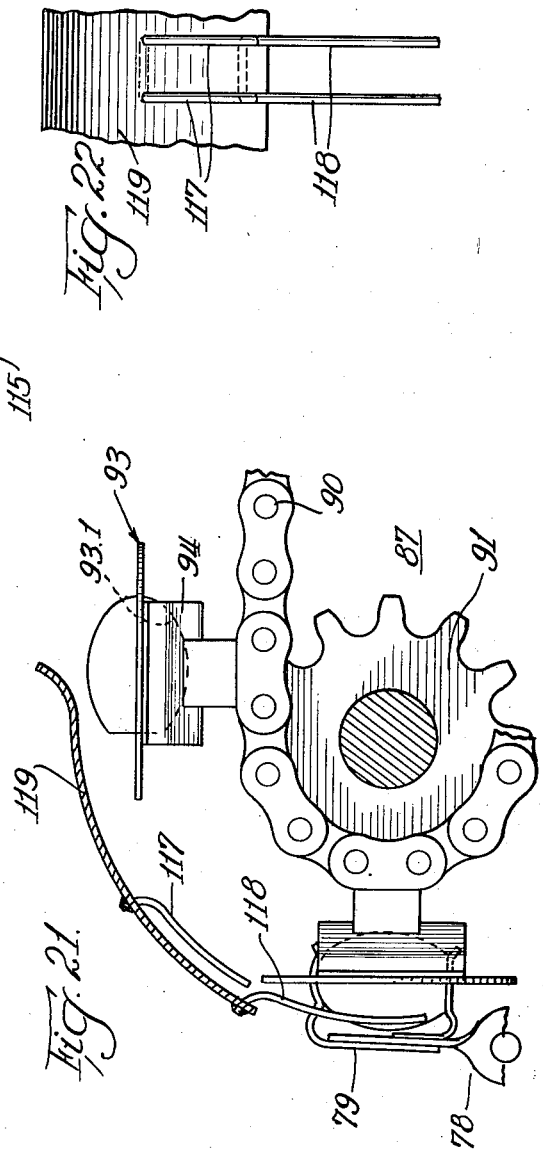
INVENTOR.
Thomas C. Kelly
BY
Mann and Brown
Att'ys.

Oct. 19, 1954 — T. C. KELLY — 2,692,073
OLIVE PACKING MACHINE
Filed May 2, 1950 — 12 Sheets-Sheet 12

INVENTOR.
Thomas C. Kelly
BY
Mann and Brown
Attys.

Patented Oct. 19, 1954

2,692,073

UNITED STATES PATENT OFFICE 2,692,073

OLIVE PACKING MACHINE

Thomas C. Kelly, Hinsdale, Ill.

Application May 2, 1950, Serial No. 159,495

14 Claims. (Cl. 226—14)

This invention relates to a machine for mechanically packing small, specially formed, objects, as, for example, pimiento olives, in predetermined relative positions in a container.

The main objects of this invention are to provide:

A machine for mechanically packing containers with a plurality of small, specially-formed objects in predetermined position on successive levels within the container;

A machine of this kind particularly adapted to so position pimiento olives in transparent containers that the olives are disposed in vertical tiers, with the pimiento facing outwardly and exposed to view;

An improved means for placing olives individually in the container;

An improved means for successively alining olives and delivering them to said placing means so that the pimiento will face outwardly in the container;

An improved arrangement of a plurality of the aforesaid olive-placing and olive-alining and delivering means, so coacting that pimiento olives are simultaneously placed in a plurality of containers at successively higher levels from the bottom of a container to the top thereof;

Improved mechanism for actuating each unit of the olive-placing means so that a plurality of pimiento olives may be variously positioned on one level in a container; and An improved conveyor means for moving containers successively into position for receiving olives from the respective olive-placing units and advancing the packed containers on for other servicing.

The accompanying drawings are diagrammatic and generally show only so much of the structure as is essential to understanding the basic concept. However, the views are believed to clearly illustrate the character and functioning of the mechanisms essential for effecting the desired results. It will be understood that the complete structure will incorporate various mechanisms not indicated in these diagrammatic views but which are well known to those skilled in the art and are commonly used to make efficient the functioning of automatic packaging apparatus.

In these drawings—

Fig. 1 is a diagrammatic perspective of the general character and arrangement of the several mechanisms and the power producing and transmitting means for operating the same which comprise an olive-packing machine constructed in accordance with this invention;

Fig. 2 is a front elevational view showing (a) the conveyor mechanism by which the containers are intermittently advanced through sixteen packing stations, (b) the rocker arm whereby the several olive-placing units are simultaneously reciprocated to position the olives at the respectively different levels for the several packing stations, and (c) the cam and link means whereby the placing units are rotated to permit each unit to place two or more olives on the respective levels (as indicated in the figure);

Fig. 3 is a detail plan view of the aforesaid cam and link means;

Fig. 4 is a plan view of the general arrangement whereby the olives are received from a source of supply, first alined, and then transferred to the placing units for the containers which are advanced along a series of packing stations;

Fig. 5 is an end elevation (from the bottom of Fig. 4), illustrating one form of mechanism for alining the olives and transferring them to the olive-placing mechanism;

Fig. 6 is a further detail enlarged view of the transfer shuttle for the olive-alining and transfer mechanisms, whereby olives are delivered to the placing units so disposed that they are placed in the containers with the pimiento in contact with the wall of the container and thereby exposed to view;

Fig. 7 is a somewhat enlarged elevational view of the olive-placing unit at station No. 1, indicating in full line the angular disposition of the unit to the container for placing the first olive on the lowermost level for the container at packing station No. 1 and showing by a dot and dash line the opposite angular disposition for placing the second olive on the lowermost level of the container at station No. 1;

Fig. 8 is a similar view showing the angular disposition of the olive-placing unit at station No. 2 for positioning both the first and second olives on the second level;

Fig. 9 is a view similar to Fig. 7 but indicating in full and dotted outline the angular disposition of the olive-placing unit for positioning the olives on the level corresponding to station No. 15;

Fig. 10 is a view similar to Fig. 8 but showing the angular disposition of the olive-placing unit for positioning the olives on the final level at station No. 16;

Fig. 11 is a transverse, vertical elevation taken on the line 11—11 of Fig. 2 showing the manner of mounting the olive-placing units to permit their vertical reciprocation and angular alteration with respect to the containers;

Fig. 12 is an enlarged, cross-sectional view of one of the olive-placing units showing the relationship of the parts after the olive has been positioned and just prior to the retraction of the spring clips from the olive;

Fig. 13 is a similar view but showing the relationship of the parts after the spring clips have been retracted from the olive;

Fig. 14 is an enlarged fragmentary view taken from above the packing units shown in Figs. 7 and 8 and indicating the relatively different angular movements of the olive-placing units for packing stations Nos. 1 and 2;

Fig. 15 is a similar view for the olive-placing units for stations Nos. 7 and 8;

Fig. 16 is a similar view for the olive-placing units for stations Nos. 15 and 16;

Fig. 17 is an end elevation from the left of Fig. 2, showing the scotch yoke, for reciprocating the olive-placing units, and part of the operating mechanism by which the containers are fed to, along, and from the series of packing stations, shown in Fig. 2, and by which the olive-alining and transfer mechanism is operated;

Fig. 18 is a plan view of a modified form of olive-alining means for use with the transfer shuttle means shown in Figs. 5 and 6;

Fig. 19 is a side elevation of a part of the same;

Fig. 20 is a view looking endwise of Fig. 18 showing the keyboard-actuated means for properly alining the olives before transfer to the olive-placing units;

Fig. 21 is an enlarged fragmentary view of one end of the alternative manually-operated olive-alining and transfer conveyor, showing the spring clips whereby olives are held in place as they pass over the end of the conveyor for pick-up by the olive-transfer shuttle;

Fig. 22 is a left hand end view of the parts shown in Fig. 21; and

Figure 23:
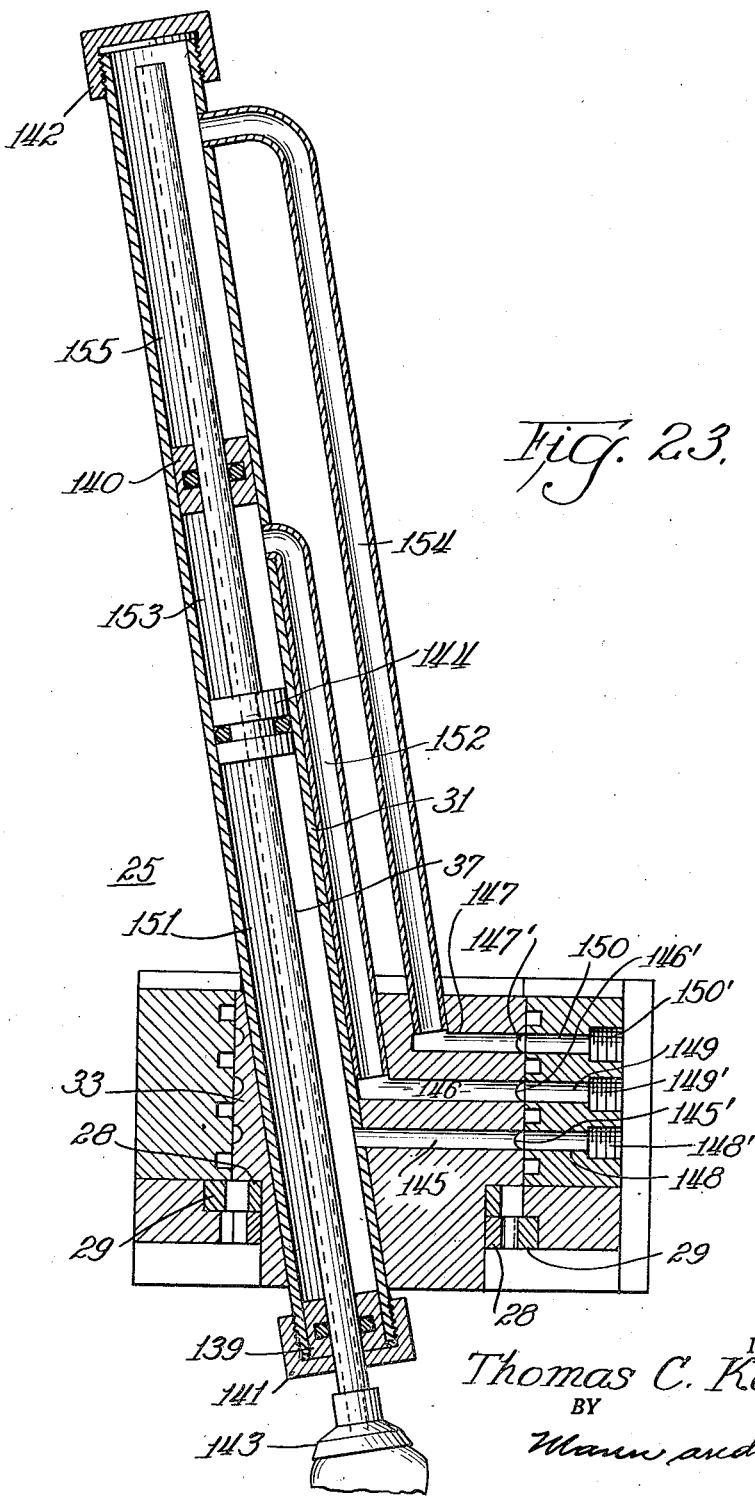

Fig. 23 illustrates a form of vacuum-operated olive-placing unit.

The essential concept of this invention involves the mechanical orienting or alining of small articles, each of which has a specially-formed exterior portion, as, for example, pimiento stuffed olives, as they are received from a source of supply and, free of all contact with human hands, placing said articles in a container so that the specially-formed exterior portion thereof is predeterminedly positioned in the container, i. e., the pimiento exteriorly visible through transparent containers.

A container packing machine constructed in accordance with this invention and designed for use in packing pimiento olives in transparent containers comprises an olive supply A from which pimiento olives are delivered to an olive-placing mechanism B, by an alining and transfer mechanism C, for positioning in transparent containers D moving on a container packing conveyor mechanism E from a conveyor F, receiving containers from a washing machine or from any other source (not shown) and transferred to a conveyor G, for delivery to a briner and capper mechanism (not shown). All of these are mounted on a suitable frame which is not herein shown and driven from a source of power through various transmission devices H.

The olive supply source A comprises a storage tank 20 from which vibrating troughs 21 convey streams of pimiento olives to the alining and transferring mechanism C for delivery to the olive-placing mechanism B.

The storage tank 20 is of a conventional construction for this purpose, with one or more outlets 22 from which the olives are conveyed by gravity to the vibrators 21. The tank 20 is provided with a conical shaped bottom 23 for draining off the liquid through a valve controlled brine outlet 24.

The vibrating troughs 21 likewise are of a conventional construction. These cause the olives to move along the paths, indicated in Fig. 4, to the respective units of the olive alining and transferring mechanism C.

The olive-placing mechanism B comprises a plurality of placing units 25 (Fig. 11), arranged along the conveyor mechanism E and reciprocated by an arm 26 (Fig. 2), as actuated by a scotch yoke 27 (Fig. 17), and rotated by gears 28 and racks 29, as actuated by a cam means 30 (Figs. 1, 2, and 3), so that each placing unit 25 positions two or more pimiento olives on a predetermined level in each of said containers D as they move along the conveyor E (see Fig. 2).

Each olive-placing unit 25 comprises sleeves 31 and 32 supported on a mounting element 33 and bracket 34, respectively. Within each sleeve is slidably mounted a tube 35 supporting at its lower end olive-holding spring clips 36 and slidably enclosing a rod 37 mounting at its lower end a head 38 which is adapted to hold an olive, once it is positioned in a container, to permit the retraction of the clips 36. Springs 39 and 40 coact to secure the relative movements of the tube 35 and the rod 37 and the tube 35 and the sleeve 31, respectively, as permitted by the latch 41.

The sleeve 31 is fixed in the mounting element 33 which element is rotatably journaled on the supporting frame (not shown) axially above a container D and has secured thereto a gear 28.

The sleeve 32 is fixed to the bracket 34 to which is connected bar 42 slidably mounted on the actuating arm 26 (see Fig. 11).

The tube 35 is supported for axial shifting in the sleeves 31 and 32 and mounts a collar 43 inwardly of its inner end which serves as a bearing for the rod 37. Between the collar 43 and the head 38 on the rod 37 is retained the spring 39. At the lower end of the tube 35 is fixed a collar 44 which mounts the spring clips 36 for gripping the olive (see Figs. 12 and 13). Adjacent its upper end the tube 35 has fixed a collar 45. Against this collar and the sleeve 32 are held cap washers 46 and 46' by the spring 40. Both cap washers are relatively slidable with respect to the tube 35.

The rod 37 is slidably supported in the tube 35 by the collar 43 and the head 38 and extends out through the upper end of the sleeve 32 where it mounts a collar 47 which serves as a knockout cocking stop, as will be pointed out more fully hereinafter.

The spring 39 is somewhat stronger than the spring 40 and normally is under compression to cause such a rapid relative axial movement of the tube 35 and the rod 37 as will effect a retraction of the spring clips 36 from and a consequent release of the olive. The spring 39 is held under such compression by the latch 41, as will presently appear.

The spring 40 cushions the retraction of the tube 35 under the action of the spring 39.

The latch 41 is fixed to the rod 37 and operates the same as an umbrella catch which holds the umbrella in its open position but is retractable to permit the closing of the umbrella. The latch 41 normally extends into a recess 48 in the tube 35 and prevents any relative axial movement of the tube 35 and rod 37 under the action of the spring 39 except and until the latch 41 is retracted by the initial relative movement of the tube 35 and the sleeve 32. This relative movement of the tube 35 and the sleeve 32 occurs as an olive-placing unit 25 positions an olive at the spot which it is to occupy in the container. At that time a slight continued downward movement of the arm 26 causes the sleeve 32 to press the cap washer 46' against the latch 41 and retract it from the recess 48. This frees the spring 39 and permits it to instantly set the rod head 38 against the olive and snap the clips 36 free of the olive.

The actuating arm 26 extends above and along the row of containers D at one side of a vertical plane through said containers. The arm is pivoted to the supporting frame (not shown) at 49 (Fig. 2) and at its free end is connected by a link 50 to the scotch yoke 27 whereby the arm 26 is oscillated between a horizontally disposed position and an upwardly inclined position (see Fig. 2). The arm 26 is connected by bars 42 to the sleeve 32 for each of the respective olive-placing units 25 (see Fig. 11). Thus, as will be most clearly apparent from Fig. 2, the oscillation of the arm 26 causes the respective olive-placing units 25 to have gradually lessening vertical movement, beginning with the placing unit at station No. 1 and extending to the placing unit at station No. 16. Hence, the spring clips 36 for the respective placing units 25 move from their retracted positions in horizontal alinement to a successively higher level for each of the containers between station No. 1 and station No. 16.

The scotch yoke 27 (see Fig. 17), to the upper end of which the arm 26 is connected by the link 50, is mounted for reciprocation by a cam 51 fixed on a shaft 52 which at its opposite end is connected to operate the cam means 30. The transverse part of this yoke 27 has a slot 27' formed to receive a pin 53 on the cam 51. The upper edge of the slot 27', intermediate its ends, is recessed to provide a dwell 54 which permits the arm 26 to remain stationary during the passage of the pin 53 through the upper arc of its movement. This allows the olive-placing units 25 to remain momentarily stationary in their fully retracted positions long enough to permit the olives to be positioned in the spring clips 36 by the olive alining and transferring mechanism C. Suitable springs (27.1) are provided to hold the yoke 27 against the cam pin 53 at all times.

As indicated in Figs. 2, and 7–11, it is necessary to rotate the mounting element 33 for each of the olive-placing units 25 between each reciprocation of the arm 26 so that the tubes 35 and rods 37 enter the respective containers at different angular positions with respect to the axis of said containers for each successive olive to be placed upon the level for the respective packing position. How much this angular rotation will have to be depends upon the number of olives to be placed on a given level. In the embodiment herein shown, two olives are placed on a given level. Hence, the rotation of one set of alternate mounting elements 33 would be 90 degrees and reverse in opposite directions before and after the placing of each olive and for the other set of alternate elements 180 degrees and reverse only before and after the placing of the second olive. This means that for the alternate packing stations, beginning with the first station at the left hand end of Fig. 2, the mounting elements 33 supporting the respective tubes 35, must be given the 90 degree rotations, whereas for the alternate placing units 25, beginning with the second packing station from the left of Fig. 2, the mounting elements 33 have to be rotated 180 degrees before and after the placing of the second olive on a given level. (See Figs. 14–16.)

The gears 28 and racks 29 (see Figs. 1 and 6) effect this differing rotation of the alternate sets of mounting elements 33 under the action of the cam means 30. To that end the gears 28 and the racks 29 for the two sets of alternate elements 33 are located on different horizontal levels (see Fig. 6) and differently actuated by said cam means 30 (see Fig. 2). As will be most clearly noted from Fig. 2, the cam means 30 comprises two tracks 55 and 56, connected by rocker arms 57 and 58 and links 59 and 60, with the respective racks 29. These cams have their high and low points diametrically opposite and on the same diameter for both cams. However, cam 55 has two diametrically opposite points intermediate the high and low angularly disposed 90 degrees from the high and low points. Thus cam track 55 effects the opposite 90 degree movements for the placing units 25 at the alternate packing stations beginning with the first from the left of Fig. 2, between the delivery of each olive to the corresponding placing unit 25. Cam track 56 effects the 180 degree movements of the alternate olive-placing units 25, beginning with the second packing station from the left of Fig. 2, following the delivery of alternate olives to the corresponding olive-placing unit. These respective angular movements are indicated in Figs. 14, 15, and 16.

Both cam tracks 55 and 56 are so formed at the points 90 degrees between the respective high and low points as will insure no movement of the racks 29 during the period of delivering the olives to the respective placing units 25 and their discharge therefrom.

Suitable two-to-one gearing 30.1 connects the cam means 30 with the shaft 52 mounting the cam 51 (which effects the oscillation of the rocker arm 26) so that the action of the gears 28 and racks 29 is appropriately synchronized with the reciprocation of the olive-placing units 25.

The olive alining and transferring mechanism C may be constructed to operate either wholly automatically or manually, so far as concerns the alining of the olives to insure their positioning in the container with the pimiento disposed outwardly against the wall of the container.

A form of each type of alining means is shown in the drawings. One of these employs a photoelectric cell-actuated solenoid (Fig. 5). The other employs a finger-operated keyboard (see Figs. 18, 19, and 20). Either means is suitable for use with the same transfer shuttle, as will be pointed out presently. In either modification the mechanism would involve the use of a unit for each of the olive-placing units 25.

The wholly automatic olive-alining and transferring mechanism C, consists of a battery of units each comprising a vacuum wheel 61, an olive dislodging means 62, a conveyor means 63, and a transfer shuttle 64. By this means each unit receives olives from a vibrating trough 21, and, when properly positioned, are transferred to an olive-placing unit 25 so that when each olive is placed in a container D, the pimiento is in contact with the wall of the container and exposed to view exteriorly thereof.

The vacuum wheels 61 for the several units are co-axially journaled on the supporting frame (not shown) and are suitably connected to a source of air suction and a common driving means to be pointed out subsequently. Each wheel comprises a plurality of spokes 65, the ends of which are provided with suitable vacuum cups for contacting and holding the olives on the spokes. As the wheel 61 rotates, the olives from a vibrating trough 21 come into contact with the ends of the spokes 65 and are caught by the cups thereon.

The olive-dislodging means 62, for each vacuum wheel 61, comprises a rocker arm 66, a solenoid-actuated armature pin 67, a photo-electric cell 68, a lamp 69, and a circuit maker and breaker 70 (see Fig. 5).

The rocker arm 66 is T-shaped and so pivoted at 71 and urged by a spring 72 that the end of the stem is normally positioned to dislodge the olives held by the spokes 65 as the wheel 61 rotates.

The photo-electric cell 68 and the lamp 69 are so placed that a reflection of light from the pimiento, when in axial alinement with the cell 68, will result in an energization of the solenoid, with a consequent actuation of the armature pin 67 sufficient to rock the arm 66 against the action of the spring 72 and retract the end of the stem of the arm 66 from the path of the olive. Passing the rocker arm 66 the olive will be transferred to the conveyor 63.

The circuit maker and breaker 70 is so arranged and actuated that there is no light until the axis of an olive is nearly in alinement with the axis of the cell 68. This avoids the likelihood of the cell 68 being activated by a reflection of a red ray of light—if the light were on continuously—from the pimiento end of an olive approximating proper position on a spoke 65.

The olives dislodged from a wheel 61 drop onto a special conveyor 73 by which they are returned to the tank 20 for the vibrating troughs 21.

The transfer conveyor 63 for this modification of olive alining and transferring mechanism C comprises a link belt 74 for each unit mounting spring clips 75 so positioned as to pick off, from the ends of the spokes 65 of the respective vacuum wheels 61, olives that pass the dislodging means 62 because they are so positioned that the pimiento will be exposed exteriorly through the container when the olive is packed.

Figure 1:
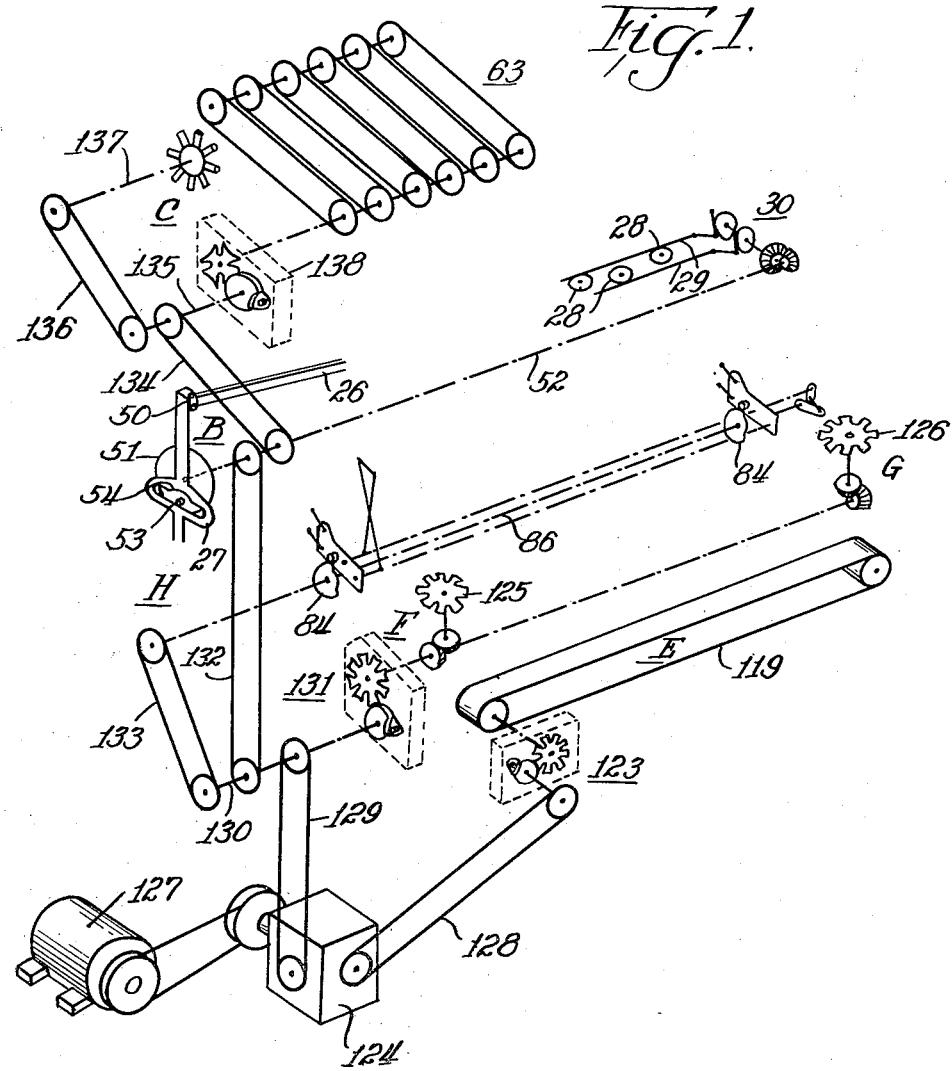

The transfer shuttle 64 for delivering olives to each of the olive-placing units 25 comprises a pair of rocker arms 76 and 77 (see Fig. 6) connected together at their upper ends by a link 78 carrying a spring clip 79. The rocker arms are secured to rods 80 and 81, co-extensive with the series of olive-placing units 25, and which at their ends are journaled on mountings 82. The rocker arms 76 are oscillated by cranks 83 and links 83.1 and the mountings 82 are reciprocated by cams 84 mounted at the ends of a shaft 85 as indicated in Fig. 1. Through the coaction of the cranks 83 and cams 84, the clips 79 are positioned vertically, at one end of their travel, to engage olives held by clips 75 on the conveyors 74 and remove them therefrom and positioned horizontally at the other end of their travel, to transfer the olives to the spring clips 36 on the respective olive-placing units 25 and from which the clips 79 are retracted by the downward movement of the mountings 82.

The alternative manually-operated olive-alining and transfer mechanism C, shown in Figs. 18–22, comprises a battery of conveyors 87 between the vibrators 21 and olive placing units 25, wherewith are associated pairs of olive tumbling belts 88 and 88', transfer shuttles 64, and one or more keyboard-actuated olive-alining means 89.

Each of the conveyors 87 is a conventional link belt 90, traveling over sprocket wheels 91, with a certain link mounting a bracket 92 upon which is rotatably supported an olive cradle 93. The bracket 92, as most clearly shown in Fig. 20, is formed with a V-shaped trough 92.1 extending longitudinally of the link belt 90. The cradle 93 is formed with a pocket 93.1 bordered by an annular flange 96 with radially disposed slots 96.1 extending inwardly from the periphery thereof. The pocket 93.1 is of elliptical form, to the underside of which is secured a V-shaped base 94 (see Fig. 20) normally adapted to seat in the trough-shaped pocket 92.1 when the pocket 93.1 is disposed longitudinally of the line of travel of a conveyor 87. The cradle 93 is held in its rotative relation on the bracket 92 by a pin 95 secured to the cradle 93, the lower end of which pin is peened to prevent dislodgment of the cradle 93 from the bracket 92. The slots 96.1 are spaced 90 degrees apart around the periphery of a cradle 93 forty-five degrees to the line of travel of a conveyor 87. These slots are for the reception of an arm 97 on the keyboard-actuated olive alining means 89, whereby the cradles 93 may be successively rotated 90 degrees to insure such an alinement of the olives that when transferred to an olive placing unit 25 the olives will be located in the containers with the pimiento exposed. These conveyors 87 are given an intermittent movement by a Geneva cam means to be presently described.

The olive-tumbling belts 88 are arranged in pairs at the sides and above each of the conveyors 87 adjacent the point at which the conveyors 87 receive the olives from the vibrators 21. As will be most clearly noted from Fig. 18, the pairs of olive-tumbling belts 88 at the sides of the conveyors 87 travel over pulleys 98 and 99 of differing diameters. These pulleys 98 and 99 are so located that the stretch of belt 101 on one side of these pulleys is parallel to the travel of a conveyor 87, whereas the stretch of belt 102 on the other side of the pulleys is disposed at an angle to said line of travel and converging toward the next adjacent stretch of belt 101. As will be further noted from the arrows in Fig. 18, the belts 100 on opposite sides of a conveyor 87 are rotated in the same direction, which results in the stretch of belt 101 moving in the opposite direction from the stretch of belt 102. Thus, an olive caught between these oppositely moving belts will have gentle pressure applied to dispose it toward nesting in a cradle 93 with the long dimension of the olive in the line of travel of the conveyor 87.

From Fig. 19, it will be noted that a pair of olive tumbling belts 88' is arranged in tandem along the top of a conveyor 87 with the belt 103 in advance of and the belt 104 between the belts 100 and 101. These belts are of different lengths and travel in opposite directions. The shorter belt 103 travels between pulleys 105 and 106 so that the lower stretch is parallel to and moves opposite to a conveyor 87. The longer belt 104 travels between pulleys 107 and 108 so that the lower stretch is also parallel to but moves in the same direction as the conveyor 87. Thus, as will be most apparent from Fig. 19, a pair of olive-tumbling belts 88 and 88' cooperate to turn the olives with their longitudinal dimensions parallel to a line of travel of a conveyor 87. However, such disposition may be with the pimiento facing forward or rearward of the line of travel. It is, therefore, necessary to provide means for manually turning the olives 180 degrees when the pimiento is trailing the direction of travel as the olives leave the tumbling belts.

The keyboard-actuated olive turning means 89, comprises a carriage 110 mounting a keyboard 111, the keys 112 of which are connected to operate the cradle-turning arms 97 through the action of bell crank levers 113 and links 114. One or more of these keyboards 111 are mounted to travel on tracks 115 along opposite sides of the battery of conveyors 87.

There is an arm 97 for each conveyor 87, those for one-half of the conveyors 87 being mounted on the carriage 110 on one side of said conveyors 87. These arms are so mounted on the carriage 110 that they are in alinement transversely of the line of travel of the battery of conveyors 87. Each arm 97 is connected to a key 112 so that a depression of one key results in the swing of that arm 97 into the path of the slots 96.1 in the cradles 93 against the action of a spring 116. As a conveyor 87 moves the next cradle 93 forward, it is given a 90 degree turn. The keyboard 111 being movable along a conveyor permits a second operation of a key to move an arm 97 into position to effect a further 90 degree rotation of a cradle 93, thereby completing a 180 degree turn of a cradle 93 and insuring the disposition of the pimiento so that it will be exposed through the container when the olive is transferred from a conveyor 87 to an olive placing unit 25.

In order to retain the olives in the cradles 93, as the cradles 93 move around a sprocket wheel 91, prior to the olives being engaged by the spring clip 79 on a transfer shuttle 64, a pair of hairpin-shaped wire retainers 117 and 118 are mounted on a plate 119 to yieldingly hold the olives in the respective cradles pending their engagement by a spring clip 79. As a clip 79 is retracted, the retainer 118 spreads to allow the olive to pass between the prongs thereof.

The containers D are formed of transparent material, preferably glass. They are of a diameter and height to contain a predetermined number of olives on a predetermined number of levels. They are received from a suitable washing machine or other source of stock (not shown) and advanced through the successive packing stations to have the olives packed therein on successive levels by several olive-placing units 25, as most clearly indicated in Fig. 2.

The container-packing conveyor mechanism E comprises a belt 119, mounting container pockets 120 (see Figs. 7–11), which travels around suitable pulleys 121 and 122 (see Fig. 2). One of these pulleys is intermittently actuated by a Geneva cam means 123 (see Fig. 1) which is connected to the main drive through a reduction gear assembly 124 so as to intermittently and successively move the containers D through a series of 16 packing stations, shown in Fig. 2.

At opposite ends of the belt 119 are located star wheels 125 and 126, respectively. (See Figs. 1, 2 and 4). The former moves the empty containers from the conveyor F and onto the conveyor belt 119, whereas the latter moves packed containers from the conveyor belt 119 onto the conveyor G for transmission to a briner or capper (not shown).

The transmission mechanism H, most clearly indicated in Fig. 1, connects a source of power, such as an electric motor 127, with the several mechanisms hereinbefore described and includes the reduction gear assembly 124 from which suitable link belts 128 and 129 lead to the Geneva cam means 123 for the container packing conveyor mechanism E, and to a jack shaft 130 mounting a Geneva cam means 131 which operates the star wheels 125 and 126 for the conveyors F and G. Suitable chain and sprocket means 132 and 133 connect the jack shaft 130, respectively, with the shaft 86, for the transfer shuttles 64, and the shaft 52, whereon is mounted the scotch yoke cam 51 and the cam means 30, for respectively effecting the reciprocation of the several placing units 25 and their rotation incident to locating two or more olives on a predetermined level in a container D. The shaft 52 in turn is connected by a chain and sprocket means 134 to another jack shaft 135, which is connected by a chain and sprocket 136 to a shaft 137. The shaft 136 operates a Geneva cam means 138 for effecting the intermittent movement of the conveyor means 63 or 87, (depending upon which of the two forms of olive-alining and transfer mechanism C is used). The shaft 137 mounts the vacuum wheels 61 for the automatic olive alining and transfer mechanism C.

A form of vacuum operated olive-placing unit 25 is shown in Fig. 23, which could be used as an alternative to the reciprocated arm and spring holding clip arrangement hereinbefore described. This alternative form of olive-placing unit 25 comprises a sleeve 31 fixed on a mounting element 33 at an angle inclined to the axis of the mounting and wherein is slidably mounted a tubular rod 37 comparable to the correspondingly numbered parts of the aforesaid reciprocating arm and spring holding clip olive-placing unit 25.

The sleeve 31 in this alternative form has collars 139 and 140, which slidably support the tubular rod 37. The ends of the sleeve 31 are provided with caps 141 and 142, which seal the ends of the sleeve 31.

The tubular rod 37 is slidably supported on the collars 139 and 140, and mounts a vacuum cup 143 on its outer exposed end and a piston 144 intermediate its ends between the sleeve collars 139 and 140.

The rotatable element 33 is channeled axially at 145, 146, and 147. The channel 145 is connected to a chamber 151 between the collar 39 and the piston 144; the channel 146 is connected by a tube 152 to a chamber 153 between the collar 140 and the piston 144; and the channel 147 is connected by a tube 154 to a chamber 155 between the collar 140 and the cap 142. Vacuum or air pressure admitted to these chambers effects the holding of an olive on the vacuum cup 143 or its release therefrom and the reciprocation of the tube 37 in the sleeve to place olives in containers D. Inasmuch as the mounting element 33 for each of these placing units 25 is oscillated through an angle of 180 degrees between the successive placing of olives in a container, the channels 145, 146, and 147 communicate with grooves 145', 146', and 147', extending circumferentially around the element 33 so as to constantly register with the respective ports 148, 149, and 150 in the support for the mounting 33. These inlet ports 148, 149, and 150 communicate with feed lines 148', 149', and 150' connected to a valve-controlled source of air pressure and/or suction (not shown) to effect the holding and release functions of the vacuum cup 143, and the opposite reciprocation of the rod 37, as will be explained subsequently.

The mounting element 33, for each vacuum-operated placing unit 25, has secured thereto a gear 28, meshing with a rack 29 actuated by the cam means 30. As hereinbefore explained, alternate placing units 25, beginning with station No. 1 (see Fig. 2) have to have different angular movements between the successive placing of olives. Hence, as shown in Fig. 23, the gears for alternate elements 33 are located on different levels, the racks 29 have the meshing teeth correspondingly arranged.

The operation of the herein shown olive packing machine, embodying this invention, is substantially as follows: such operation will be described, first, as it relates to a machine embodying the fully automatic olive-alining and transfer mechanism C and subsequently as it is altered by the use of the manually-operated olive-alining and transfer mechanism C. Moreover, such operation will be described for a machine employing the reciprocating arm and spring clip olive-holding means 25, the modification of that operation when the vacuum-controlled olive-placing units 25 are employed being subsequently set forth.

For a machine using either type of olive-alining and transfer mechanism C or either type of placing unit 25, the machine cannot begin full and effective operation until there is a container D at each of the packing stations (see Fig. 2) and all the containers, except the container at the first station, partially packed so that the respective olive-placing units 25 may position the olives at the respective levels from the lowest level for packing station No. 1 to the highest or last packing station No. 16. In preparing the machine for such full and effective operation, the initial packing of the contianers D for the successive levels could be done by hand, or, per chance, the machine could be operated as hereinafter described, allowing the olives discharged from the placing units prior to the positioning of the container D at each station, to be retrieved later and returned to the olive supply A or the vibrators 21.

By suitable means (not shown) olives are released from the storage tank D to the vibrators 21. As is well understood with devices of this kind, the olives will be moved along the vibrators 21 to the respective units of the olive-alining and transfer mechanism C.

In the machine equipped with the fully automatic olive-alining and transfer means C, shown in Fig. 5, the circuit maker 70 is normally "off." This not only saves the photo electric cell 68 from excessive depletion, but also avoids the likelihood of a ray of light being reflected from the pimiento—to activate the cell 68 and effect a retraction of the rocker arm 66 to allow an olive to remain on a spoke 65—when the olive might be not exactly positioned on the spoke for proper placement in a container, but nevertheless be so disposed that a portion of the red pimiento could reflect light sufficient to excite the photo electric cell 68. As a vacuum wheel 61 rotates, olives from a vibrator 21 are drawn into contact with the ends of the spokes 65. As the wheel 61 successively moves the olives into axial alinement with the cell 68 the circuit maker 70 is activated to "cut in" the lamp 69. If an olive has the pimiento properly alined for its exposure exteriorally of the container when finally placed, therein, the ray of light reflected from the lamp 69 to the photo electric cell 68, as the olive approaches axial alinement with the cell 68, will activate the solenoid-actuated pin 67 so as to move the rocker arm 66 out of the path of the olive allowing it to "pass" and be subsequently picked up by one of the clips on the transfer conveyor means 63. If, however, an olive is not properly positioned on a spoke 65 when it approaches axial alinement with the photo electric cell 68, a red light will not be flashed to said cell. Hence, the rocker arm 66 will remain in the position shown in Fig. 5 and effect a dislodgment of the olive. The dislodged olive will fall onto the conveyor 73 and be returned to the source of supply A or a vibrator 21.

The transfer conveyor means 63 are intermittently operated by the Geneva cam means 138 so that a clip 75 on a link belt 74 is always in position to receive an olive from one of the spokes 65 on the respective vacuum wheel 61. As the olives in these clips 75 reach the opposite end of a conveyor means 63—their movement being momentarily arrested through the action of the Geneva cam means 138—they are successively transferred by the shuttle 64 to an olive-placing unit 25. This transfer is effected by the combined action of the link 83 and the cam 84 swinging the rocker arms 76 and 77 so as to move the transfer clip 79 to grip an olive held by one of the clips 75 on a link belt 74 and deliver the olive to the spring clips 36 on an olive-placing unit 25. Such a transfer occurs at the moment the pin 53 on the cam 51 is traversing the dwell 54 on the scotch yoke 27 and all of the olive-placing units 25 are momentarily stationary in their retracted positions, as shown in Fig. 2.

It should be noted that just before this pin 53 recedes from the dwell 54, the cam 84 effects a quick downward movement of the mounting 82 so as to retract the clip 79 from the olive which has just been positioned in the spring clip 36 of an olive-placing unit 25. (See Fig. 5.) Further rotation of the shaft 86 through the action of the link 83 starts the swing of the rocker arms 76 and 77 so as to retract the clip 79 from the path to be subsequently traversed by the olive-placing unit 25, as it enters a container D.

In between each reciprocation of the arm 26, the Geneva cam means 138 effects a movement of a link belt 74 sufficient to pick up another olive from one of the spokes 65 of a vacuum wheel 61 and simultaneously move another olive in a clip 75 into position to be transferred to an olive-placing unit 25 by a transfer shuttle 64. Such movement of the link belt 74 occurs during the entrance of the olive-placing units 25 into and their recession from the containers D.

The vacuum wheels 61 are rotating constantly, whereas the companion transfer conveyor means 63 is moving intermittently. In this way provision is made to reasonably insure the delivery of a properly-alined olive to each clip 75 on the link belt 74 and the consequent transfer of an olive to the companion placing unit 25 for each entrance thereof into a container D.

It will be understood, that olives are placed simultaneously in the several olive-placing units 25, shown in Fig. 2, in the manner just described. During such delivery of olives the rocker arms 57 and 58 are traversing the intermediate parts of the respective cam tracks 55 and 56.

Immediately following the retraction of the clips 79 on the transfer shuttles 64 from the respective olive-placing units 25, the scotch yoke cam 51 initiates a downward swing of the arm 26 preparatory to depositing the olives in the respective containers D. Concurrently with the initial downward movement of the arm 26, the rocker arm 57 moves off from the intermediate part of the cam track 55 to the low point thereof so as to effect a retraction of the rack 29 to which the rocker arm is connected by the link 59. This rack 29 meshes with the gears 28 for the odd numbered alternate olive-placing units 25, beginning with station No. 1 (see Fig. 2). Consequently, the shifting of the rack 29 causes a 90 degree rotation of the corresponding mounting elements 33 so that the inclination of the respective tubes 35 to the axes of the containers D of these odd numbered alternate stations is in the plane of the direction of movement of the conveyor belt 119. Thus, the inclination of the tubes 35 for the placing units 25 at these odd numbered alternate packing stations, when the olive is finally deposited in a container, is at right angles to the inclination of the tubes for the placing units 25 at the alternate even numbered stations, as is most clearly indicated in Figs. 7–10 and 14–16.

As the pin 53 on the scotch yoke cam 51 approaches the lower limit of its movement (see Fig. 17), the olives in all 16 olive-placing units 25 reach their respective levels in the series of containers D. The slight continued movement of this pin 53, as it approaches dead-center, causes the sleeves 32 on the respective units 25 to press the collars 46' against the latches 41 to retract them from the recesses 48. This releases the springs 39, and results in an instant pressing of the heads 38 on the end of the rods 37 of the several olive-placing units 25 against the respective olives, and a consequent retraction of the tubes 35 to release the olives from the spring clips 36. (See Figs. 12 and 13.) Not only does the spring 49 cushion the thrust of the tube 31, when the spring 39 is released, but it also accommodates the olive-placing unit 25 to over- or under-sized olives received in the clips 36 without any adjustment of the unit.

For the olives placed on the first level in the container at station No. 1, the pressure of the head 38 on the olive causes moisture to ooze out from the pimiento end of the olive against the container wall. This moisture tends to adhere the flat end of the olive and the pimiento to the container wall and hold these first-level olives in their respective positions while the container is being shifted to the second packing station preparatory to the placing of the olives on the second level.

With the continued rotation of the scotch yoke cam 51, the arm 26 begins its upward movement to withdraw the olive-placing units 25 from the respective containers D. During this upward swing of the arm 26 the continued rotation of the cam means 30 (Fig. 3) causes the rocker arm 57 to move from the low point of the cam track 55 to the opposite part intermediate the high and low points, thus reversing the shift of the rack 29 meshing with the gears 28 on the elements 33 for the odd numbered alternate placing units 25, beginning with No. 1. This reverse rotation of these elements 33 will re-dispose the inclination of the respective tubes 35 transversely to the line of travel of the belt 119 preparatory to all of the olive-placing units 25 again receiving olives from the olive-alining and transfer mechanism C.

As the rocker arm 26 approaches the upper limit of its reciprocation and the cam pin 53 again approaches the crown of the dwell 54, the sleeves 32 for the respective units 25 come into contact with the collars 47 on the several rods 37 and effect an axial movement of each rod 37 relative to the tube 35. This movement is sufficient to carry the latch 41 up into position to enter the recess 48 in the tube 35, thus compressing the spring 39 and "cocking" the respective olive-placing unit 25 preparatory to a subsequent release of the olive therefrom when the unit again enters a container D.

Following the delivery of a second olive to each of the olive-placing units 25, in the manner hereinbefore described, the arm 26 is again moved downwardly to cause the entrance of the olive-placing units 25 into the respective containers D. At this time the rocker arm 57 moves from the aforesaid "opposite" part intermediate the high and low points of the cam track 55 and toward the high point of said cam track. This results in a shift of the rack 29 in the opposite direction from that caused by the traverse of the rocker arm 57 over the low point of that cam track and again rotates 90 degrees the elements 33 for the odd numbered alternate units 25, beginning with station No. 1. However, the rotation being in the opposite direction from the previous rotation causes a second olive to be placed on the same level but diametrically opposite the olive previously placed by the respective olive-placing unit 25. Concurrently, the rocker arm 58 moves from the low point to the high point of the cam track 56. This results in a shifting of the other rack 29 so as to cause a 180 degree rotation of the elements 33 for the alternate even numbered stations, thereby causing a second olive for the respective containers to be placed on the same level as the previously placed olive but at 180 degrees therefrom. (See Figs. 7–10 and 14–16.)

As the olive-placing units 25 recede from the containers D following the placing of the second olive on the same level for the several containers D, the Geneva cam means 123 and 131 causes a sequential movement of the container packing mechanism E and the conveyors F and G. Thereupon the containers D are advanced one station as a completely packed container is delivered to the star wheel 126 and an empty container is discharged from the star wheel 125.

With the manually controlled olive-alining and transfer mechanism C, all of the operations take place as just described, insofar as they relate to the transfer of the aligned olives from the transfer conveyors 87 and their placement two on each of the respective levels in the containers D. However, the operation for aligning of the olives is as follows:

As the olives leave the vibrators 21 they successively drop into the cradles 93 for the several conveyors 87. An olive may drop onto a cradle 93 in almost any position other than nesting in the pocket 93.1. Even if an olive does drop fully nested into a pocket 93.1 it may or may not be aligned with its pimiento end properly disposed (forwardly, as indicated in Fig. 18) so that when placed in the container the pimiento will be exteriorally exposed. If the olives do fall onto the cradles 93 so as not to immediately nest in the pocket 93.1, the olive-tumbling belts 88 and 88' will coact so as to push the olives around until they will nest in the pockets 93.1.

As the cradles 93, for a conveyor belt 87, recede from the olive-tumbling belts 88, an operator standing at each side of the series of conveyor belts 87 would observe which of the olives were not properly alined (i. e., with the pimiento exposed toward the left of Fig. 18, in the line of travel of the conveyor belts 87). Upon detecting an olive not properly alined, the operator would move a keyboard 111, probably first to the right (see Fig. 18) toward the point where the misalined olive is first noted. By depressing a key 112 the arm 97, for the corresponding conveyor belt 87, is swung into a vertical position (see Fig. 20) so that its upper end comes into the path of a slot 96.1 in the cradle 93 which nests the reversely-alined olive. The subsequent movement of the respective conveyor 87 will cause the cradle 93 to rotate 90 degrees. Thereupon, the operator will move the keyboard 111 further to the left of Fig. 18 and again depress the same key 112, which again swings the arm 97 into the path of a slot 96.1 for the respective cradle 93. Thus a further movement of the conveyor 87 effects a second 90 degree turn of the cradle 93, bringing the olive into proper alinement to insure its placement in a container D with its pimiento exposed exteriorly of the container.

As the conveyors 87 move their cradles 93 around the arc of the sprockets 91, the olives in these cradles come into contact with the retainers 117 and 118 and are held against displacement from the respective cradle 93 until the clip 79 on the respective transfer shuttle 64 engages the olive, as indicated in Fig. 21. As the clip 79 is swung by the arm 76 away from the conveyor 87, the wire retainer 118 spreads so as to allow the olive to pass.

If a vacuum-air pressure operated olive-placing unit 25 were used, instead of the arm-reciprocated units hereinbefore described, a vacuum would be constantly created in the chamber 155 and the hollow tube 37 to the vacuum cup 143 so that whenever an olive was brought into proper proximity to the cup it would be retained thereby. Immediately following the transfer of an olive from the alining and transfer mechanism C to a vacuum cup 143, air pressure would be delivered to the chamber 153 so as to effect an axial shifting of the respective tube 37, thus moving the olive into the respective container D. Obviously, there would have to be the 90 degree rotation of the elements 33 for the odd numbered alternate olive-placing units 25, as hereinbefore described, as the tube 37 was making its descent.

As an olive reaches its proper position in a container D, there would be not only a momentary release of the vacuum in the chamber 155 and the rod 37, but a concurrent delivery of air pressure so as to insure a release of the olive from the cup 143, as the rod 37 is retracted by the delivery of air pressure to the chamber 151.

During the retraction of the rod 37 of the several placing units 25, preparatory to the delivery of a second olive to the respective suction cups 143, the cam means 30 would effect a rotation of the element 33 for the odd numbered alternate packing units 25, as hereinbefore described. Following the delivery of a second olive to the several vacuum cups 143 for the several olive-placing units 25, and appropriately synchronized with the application of air pressure to effect an axial shifting of the rods 37 to place the second olives, the cam means 30 would effect a 90 degree reverse rotation of the elements 33 for the odd numbered alternate units 25, and at the same time effect a 180 degree angular movement of the elements 33 for the alternate even numbered olive-placing units 25, as has been described hereinbefore.

Following the recession of the rods 37, after placing the second olives on the respective levels in the containers D, the container packing conveyor mechanism E and the conveyors F and G would be actuated, as hereinbefore described, to advance the containers along the respective packing stations.

Other variations and modifications in the details of structure and arrangement of the parts may be resorted to within the spirit and coverage of the appended claims.

I claim:

1. A machine for individually packing a plurality of articles in a container comprising, means for supporting containers at a plurality of loading stations, reciprocating members mounted to enter and recede from the respective containers each a successively less distance whereby articles are placed by said members at a successively higher level in a container, means on each of said members for holding the articles to be placed, means for simultaneously reciprocating said members, means for releasing the articles from each of said holding means when the respective article has been placed in the respective container, means for delivering articles one at a time to said holding means on the respective reciprocating members, and means for advancing said containers between the reciprocation of said members.

2. A machine for individually packing a plurality of small articles in a container comprising, means for supporting containers at a plurality of loading stations, reciprocating members mounted to enter and recede from the respective containers each a successively less distance whereby articles are placed by said members at a successively higher level in a container, means on each of said members for holding the articles to be placed, means for simultaneously reciprocating said members, means for releasing the articles from each of said holding means when the respective article has been placed in the respective container, means for predeterminedly alining said articles and delivering them one at a time to said holding means on the respective reciprocating members whereby each article is placed in the respective containers in a predetermined position, and means for advancing said containers between the reciprocation of said members.

3. A machine for individually packing a plurality of articles in a container comprising, means for supporting containers at a plurality of loading stations, a plurality of reciprocating members mounted to enter and recede from the respective containers each a successively less distance whereby articles are placed by said members at a successively higher level in a container, means on each of said members for holding an article to be placed, means for simultaneously reciprocating said members, means for releasing an article from each of said holding means when the article has been placed in the respective container, means for delivering articles one at a time to said holding means on the respective reciprocating members, means for simultaneously oscillating said members after the placing of each article in the container so as to place two or more articles on the same level, and means for advancing said containers between the reciprocation of said members.

4. A container packing machine for placing articles in a container on a plurality of different levels, means for advancing containers through a succession of loading stations, a rotatable element mounted adjacent each of said loading stations, a member slidably mounted on each of said elements on an axis angularly disposed to the axis of rotation of the respective element and movable into and out of a container for placing articles therein at a predetermined level, means on each of said members for holding an article to be placed in the respective containers, means for simultaneously shifting said members on the respective elements each a successively less distance whereby articles are placed by said members at successively higher levels in a container, means for releasing articles from the respective members when properly placed in the respective containers, and means for effecting a different rotation of alternate elements whereby the relative disposition of said members and the respective containers is altered between successive entrances of said members into said containers so that two or more articles are placed on one level in a container transverse to two or more articles placed on the next adjacent level in said container.

5. A container packing machine of the class described comprising, means for disposing a container in packing position, a reciprocating member mounted to enter and be retracted from said container, means on said member for holding an article to be placed in said container, means for releasing an article from said holding means when the article is placed in said container, means for altering the position of the holding means upon each entry to place said articles in the container in predetermined array, and means for delivering articles to said holding means when said member is in its retracted position.

6. A container packing machine of the class described comprising, means for disposing a container in packing position, a reciprocating member mounted to enter and be retracted from said container, means on said member for holding an article to be placed in said container, means for releasing an article from said holding means when the article is placed in said container, means for delivering articles to said holding means when said member is in its retracted position, and means for turning the holding means and also altering the axial disposition of the same between successive entrances of said member into said container whereby successively placed articles are placed in the same plane in differently facing positions.

7. A machine for packing pimiento olives in transparent containers comprising, means for disposing a container in packing position, a reciprocating member mounted to enter and be retracted from said container, means on said member for holding a pimiento olive, means for releasing an olive from said holding means when the olive is placed in said container, means for turning the holding means and also altering the axial disposition of the same upon each entry, said turning and altering being sufficient to produce in the container a layer of the olives in predetermined array and means for successively delivering pimiento olives to said holding means with the exposed pimiento placed to face outwardly in said container.

8. A machine for packing pimiento olives in transparent containers comprising, means for disposing a container in packing position, a reciprocating member mounted to enter and be retracted from said container, means on said member for holding a pimiento olive, means for releasing an olive from said holding means when the olive is placed in said container, means for successively delivering pimiento olives to said holding means with the exposed pimiento placed to face outwardly in said container, and means for reversing the position of the holding means and also altering the disposition of the same between successive entrances of said member into said container whereby successively placed olives are placed in the same plane in end-to-end relation with the pimientos therein facing in opposite directions.

9. A machine for packing pimiento olives in transparent containers comprising, means for disposing a container in packing position, a reciprocating member mounted to enter and be retracted from said container, means on said member for holding a pimiento olive, means for turning said holding means upon each entry to produce in the container a layer of the olives in predetermined array, means for releasing an olive from said holding means when the olive is placed in said container, means for receiving pimiento olives from a source of supply and aligning each olive with the exposed pimiento predeterminedly positioned, and conveyor means for transferring the olives successively from said olive-receiving and aligning means to said holding means with the exposed pimiento placed so as to face outwardly in said containers when placed therein by said holding means.

10. A machine for packing in a predetermined relationship in a container articles having a specially-formed exterior portion comprising, means for disposing a container in packing position, a reciprocating member mounted to enter and be retracted from said container, means on said member for holding one of the aforesaid articles, means for turning said holding means upon each entry to produce in the container a layer of the articles in predetermined array, means for releasing an article from said holding means when the article is placed in said container, a conveyor for successively transferring said articles from a source of supply to said member, and means associated with said conveyor for aligning said articles in said conveyor whereby when transferred to said member the specially-formed portion of said article will be disposed to occupy said predetermined position in said container.

11. A machine for individually packing a plurality of articles in a container comprising, means for supporting containers at a plurality of loading stations, reciprocating members mounted to enter and recede from the respective containers each a successively less distance whereby articles are placed by said members at a successively higher level in a container, means on each of said members for receiving and holding the articles to be placed, means for simultaneously reciprocating said members, means for releasing the articles from each of said holding means when the respective article has been placed in the respective container, and means for advancing said containers between the reciprocation of said members.

12. A machine for individually packing a plurality of articles in a container comprising, means for supporting containers at a plurality of loading stations, a plurality of reciprocating members mounted to enter and recede from the respective containers each a successively less distance whereby articles are placed by said members at a successively higher level in a container, means on each of said members for receiving and holding an article to be placed, means for simultaneously reciprocating said members, means for releasing an article from each of said holding means when the article has been placed in the respective container, means for simultaneously oscillating said members after the placing of each article in the container so as to place two or more articles on the same level, and means for advancing said containers between the reciprocation of said members.

13. A container packing machine of the class described comprising, means for disposing a container in packing position, a reciprocating member mounted to enter and be retracted from said container, means on said member for receiving and holding an article to be placed in said container, means for releasing an article from said holding means when the article is placed in said container, and means for altering the position of the holding means upon each entry to place said articles in the container in predetermined array, said receiving and holding means being adapted to receive an article when said member is in its retracted position.

14. A container packing machine of the class described comprising, means for disposing a container in packing position, a reciprocating member mounted to enter and be retracted from said container, means on said member for receiving and holding an article to be placed in said container, means for releasing an article from said holding means when the article is placed in said container, and means for turning the holding means and also altering the axial disposition of the same between successive entrances of said member into said container whereby successively placed articles are placed in the same plane in differently facing positions.

References Cited in the file of this patent

UNITED STATES PATENTS

| Number | Name | Date |
|---|---|---|
| 1,348,341 | Winkley | Aug. 3, 1920 |
| 1,366,169 | Davis | Jan. 18, 1921 |
| 1,556,078 | Clymer | Oct. 6, 1925 |
| 2,325,665 | Cox | Aug. 3, 1943 |
| 2,325,816 | Waters | Aug. 3, 1943 |
| 2,326,146 | Kurzbin | Aug. 10, 1943 |
| 2,558,028 | Winters | June 26, 1951 |
| 2,587,584 | Althoff | Mar. 4, 1952 |

FOREIGN PATENTS

| Number | Country | Date |
|---|---|---|
| 106,873 | Sweden | Mar. 16, 1943 |